Aug. 6, 1968  R. M. SCHECTER ET AL  3,395,516
AIRBORNE AEROSOL COLLECTOR

Filed Jan. 31, 1964  3 Sheets-Sheet 1

FIG. 1

INVENTOR
*ROGER M. SCHECTER*
*ROBERT G. RUSS*

BY *Richard C. Reed*
ATTORNEY

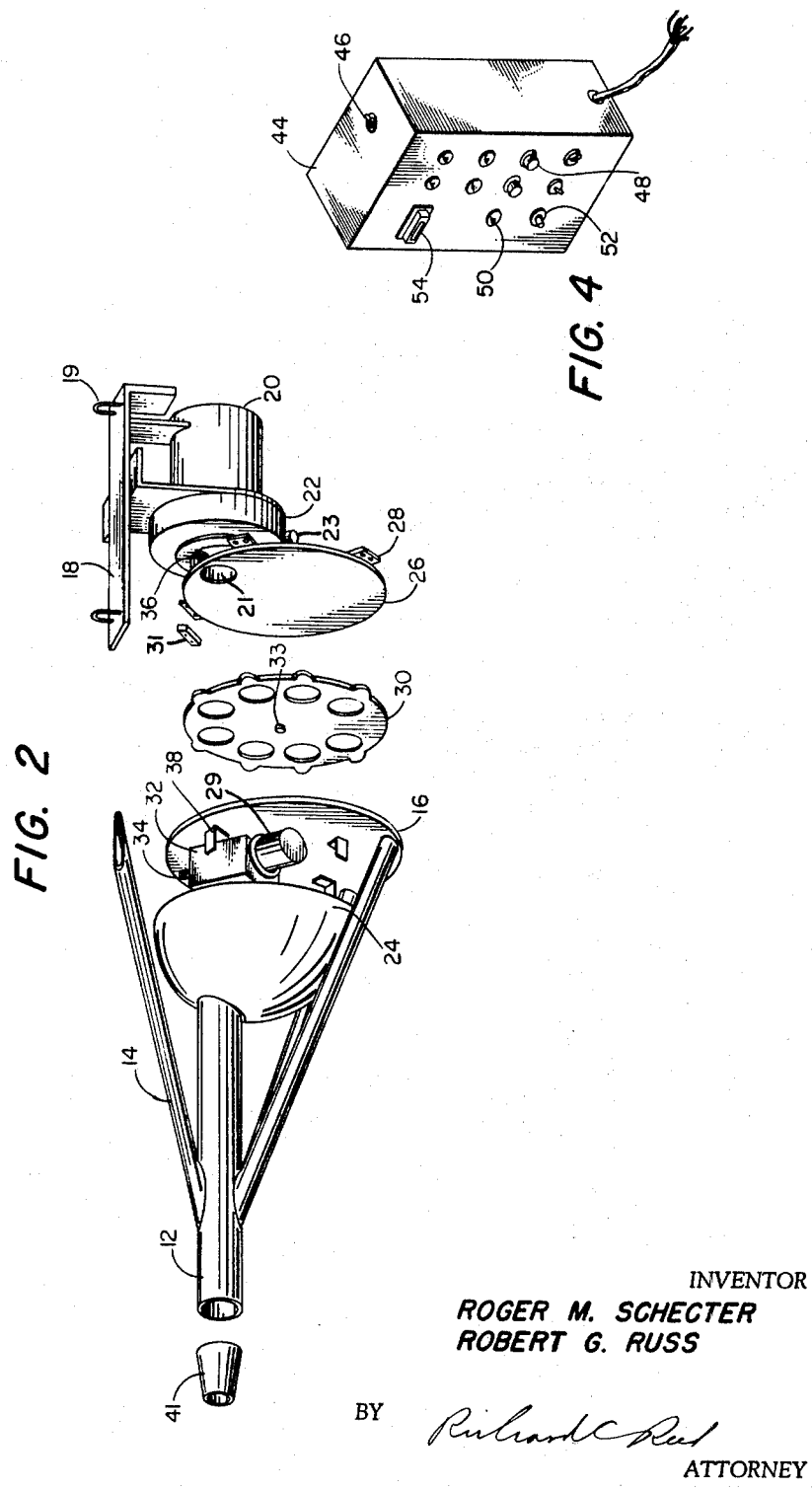

Aug. 6, 1968          R. M. SCHECTER ET AL          3,395,516
                      AIRBORNE AEROSOL COLLECTOR
Filed Jan. 31, 1964                               3 Sheets-Sheet 3

INVENTOR
ROGER M. SCHECTER
ROBERT G. RUSS

BY *Richard C. Reed*

ATTORNEY

United States Patent Office 3,395,516
Patented Aug. 6, 1968

3,395,516
AIRBORNE AEROSOL COLLECTOR
Roger M. Schecter, Hillcrest Heights, and Robert G. Russ, Accokeek, Md., assignors to the United States of America as represented by the Secretary of the Navy
Filed Jan. 31, 1964, Ser. No. 341,812
1 Claim. (Cl. 55—270)

The invention described herein may be manufactured and used by or for the Government of the United States of America for governmental purposes without the payment of any royalties thereon or therefor.

The present invention relates to an aerosol collector and more particularly to an airborne aerosol collector having iso-kinetic flow characteristics which permits greater sample collection stability.

Iso-kinetic flow is established and maintained by providing suction behind an inlet orifice and filtering elements through which air is flowing. It is a condition which establishes true static pressure ahead of the filtering elements thereby providing a truer indication of the conditions of the sampled air flowing through the filters.

Prior to the present invention, when sampling devices were used in conjunction with airplanes, the sampling device was trailed behind the aircraft, or was made an integral part of the aircraft.

Obviously when a sampling device is trailed behind an aircraft it is possible that exhaust from the engines will pass into the filter and give an erroneous reading. Also the trailing operation is a rather dangerous one, since the aircraft must land with the sampler in the trail position or must be reeled into the aircraft, which could be a dangerous operation for the crew, and could also cause error in the sample taken. When the sampler is an integral part of the aircraft, any malfunction of the sampling system will automatically place the aircraft out of commission. In addition the prior art makes no provision for adjusting air through the filter to that of the air speed of the aircraft, so as to establish true static pressure ahead of the filters.

The present invention is a compact light weight collector having several filters remotely controlled therein and which can be easily connected beneath the wing of an aircraft with the sampling tube therefrom being forward of any aircraft exhaust. In addition there may be several of the collectors mounted on an aircraft, thereby providing a greater number of filters to be used on any one flight. Since the sample is a separate system from that of the aircraft, not intergral therewith, if there should be a malfunction in the sampler, it can very easily and readily be replaced by another unit without down time of the aircraft. A provision in the present invention is made to establish iso-kinetic flow thereby greatly adding to the accuracy of the overall device.

An object is to provide a collector device which can be used in the study of cloud physics.

Another object of the present invention is the provision of a collector device for collecting particulate matter found in the atmosphere.

Another object of the present invention is the provision of a collector which as a separate unit, is light in weight and simple in construction.

Still another object is to provide a device having a number of useful filter elements readily removable from the device for further study.

Still another object is to provide a collector device which maintains iso-kinetic flow through the filters regardless of the airspeed of the aircraft.

A final object is to provide a device which is easily and quickly mounted to a transporting vehicle.

Other objects and advantages of the invention will hereinafter become more fully apparent from the following description of the annexed drawings, and wherein:

FIG. 1 shows a complete assembled view of the invention.

FIG. 2 shows a disassembled view of the invention.

FIG. 3 shows the filters and mounting plate, with one of the filters disassembled.

FIG. 4 illustrates the control portion of the invention which is wired to the device after mounting, and which is located inside the transporting vehicle.

FIG. 5 is an illustration of the circuitry used in advancing the filters.

The invention is a sampling device primarily used in cloud physics study, but may be used as a ground device for detection of radiation or may be used in any media where fluid is moved relative to the device itself.

Referring now to the drawings in detail, wherein like reference characters designate like or corresponding parts throughout the several views, there is shown in FIG. 1 an assembled view of collector 10. Collector 10 comprises an inlet tube 12, support struts 14 which are joined to a filter mounting plate 16, wherein mounting bracket 18 having U-bolt mounting means 19 thereon, aids in joining motor 20 and exhaust or blower member 22 to the filter mounting plate and to supports 14 to form a complete assembly. Spherical member 24 which is of plastic or the like, provides a cover means for filter mounting plate 16 and also serves as a fairing, which gives the completed assembly a relatively streamline design.

FIG. 2 is an exploded view which illustrates more clearly the relationship of some of the elements. As shown, there is illustrated a backing plate 26 having securing means 28 thereon for the purpose of securing the backing plate to the filter mounting plate 16. The backing plate 26 is mounted to the inlet 21 of the exhaust blower 22 which includes an outlet 23 and is driven by motor 20. A filter carrier 30 is mounted between mounting plate 16 and backing plate 26 for rotation by motor 29 and shaft 33 which is secured to the center of filter carrier 30. Spacers 31 are secured between filter mounting plate 16 and backing plate 26 to provide spacing for rotation of the filter mounting plate. Cover 24 is shown moved away from the mounting plate in order to illustrate the various elements which are covered by cover 24. As shown, motor 29 drives shaft 33 thereby rotating filter carrier plate 30 which is provided with a plurality of filters 35 thereon. In addition to motor 29, a motor 32 operates a valve 37 within the housing which closes and opens orifice 40 by the forward and reversing switch 39 depending on the operation of the filter device. During the periods that a sample is not being taken, the valve 37 closes off orifice 40 to prevent air flow through the filter. At the time of taking a sample the valve is opened allowing air to flow through tube 12, then through filter 35, thereby trapping a sample. Members 38 are mounting brackets for fairing member 24.

Located on motor 32, and on exhaust member 22, are pressure taps or valve means 34, 36 respectively to which are connected pressure indicators. Prior to taking a sample, the filter carrier member which may or may not have a filter therein, is advanced adjacent opening 40. The valve member which seals the filters from inlet tube 12 is now opened allowing air to flow through the collector. At this point, a pressure reading is taken from the instrument connected to valve 34, and compared with that of the static pressure system of the aircraft. If there is a differential in readings, blower 22 is adjusted by controlling the speed of motor 20 by use of a control means such as a potentiometer 41, variable resistor or a rheostat until the air through the collector is the same as the air speed of the aircraft, thereby establishing an iso-kinetic condition between the two, and as a result a greater sampling accuracy is achieved. Therefore in operation, air flows into tube 12, through the filter, and out through exhaust 22.

If it is necessary to get an iso-kinetic condition, motor 20 is adjusted thereby resulting in the correct flow of air through the filters.

With the full cross sectional area of the inlet tube open to the ram air the blower would suck an excess of air through the filter resulting in an improper flow rate. The inlet tube is therefore choked down by the nozzle 41 so that iso-kinetic flow is within the range of the given blower.

Referring to FIG. 3, there is shown filter carrier plate 30 attached to filter holding plate 16, with one of the filters disassembled thereby by depicting the alignment of filters 35 with tube 12. Switch 42 comprising contacts 43 and 45 and a movable contact arm 47 which has a roller 51 on the end thereof insulated from the movable contact operating in conjunction and in such working relation with the cam portions 49 on the circumference of member 30, that when a filter advances to the proper sampling position, opposite opening 40, switch contact arm 47 which is operated by the cam positions of member 30, breaks contact with contact 45 and makes contact contact 43 to complete the circuit to the counter 54 which advances counter 54 and automatically stops the cycle. By breaking contact with contact 45, the circuit to the relay 56 is broken thereby the circuit to the motor 29 is broken which stops rotation of the motor and filter carried member 30.

FIG. 4 is a representation of the controls required to operate the controller, wherein member 44 is the housing and 46 the master switch. Member 48 represents the over current protection devices which may be fuses or the like and members 50, 52 and 54 represent the indicator lights, start button and counter respectively, the operation of which will be more fully ascertained in the light of FIG. 5.

In discussing the operation and controls in detail, reference is made to FIG. 5 in which master switch 46 is moved to the on position energizing the circuit wherein a light 50, provides a ready indication of such circuit energization. Upon iso-kinetic conditions being maintained in the system, as previously explained, button 52 is pressed activating relay 56 thereby energizing the relay coil and coil contacts wherein motor 29 is energized advancing the filter carrier. As the filter carrier rotates, the switch contact arm 47 is lowered off the cam and the circuit is completed through contact 45 to the relay coil, thus when hand operated switch 52 is released the circuit is completed to the relay coil and to the motor through the separate relay contacts. As the next filter in line of use is moved opposite opening 40, switch arm 47 is raised by cam 49 opening the circuit to the relay coil through contact 45 and closing the contact 43 of switch 42, thus counter 54 advances to the next numbered filter in the order of use and also lights a second bulb 50 indicating the new filter is ready in position for use. When the contact arm of switch 42 reaches maximum travel, relay 56 is de-energized, wherein the circuit is once more ready for energization and for filter advance. A minimum of eight filters may be used. However it is possible to provide a filter carrier capable of holding more or even fewer filters, and still be within the scope of the invention.

The various elements set forth above are of the type which are well known in the art and requires only the skill of one in the art to assemble the collector in accordance to the teachings set forth above.

Obviously many modifications and variations of the present invention are possible in the light of the above teachings. It is therefore to be understood that within the scope of the appended claim the invention may be practiced otherwise than as specifically described.

We claim:
1. An aerosol collector device for collecting particulate matter in the atmosphere, which comprises:
a rotatable filter disc element,
a plurality of separate equally spaced filter elements included in said filter disc element and radially aligned near the periphery of said rotatable filter disc element with their centers on a circle with the axis of said disc as their center,
drive means connected to said filter disc element for rotatably driving said filter disc element,
a cylindrical fluid inlet means for directing fluid to said filter disc element,
said fluid disc element being positioned relative to the outlet end of said fluid inlet means such that one of each of said separate filter elements is aligned coaxial with said inlet as said disc element is rotated relative to said inlet means,
control means connected with said filter disc drive means for rotating said filter disc element to position one of each of said filter elements in axial alignment with said inlet,
valve means for closing said inlet when a sample is not being taken and for opening said inlet when a sample is to be taken,
motor means connected with said valve means for opening and closing said valve,
fluid suction means including a motor, and a fan,
an inlet to said fluid suction means and an outlet from said fluid suction means,
said inlet to said fluid suction means being aligned with the outlet of said inlet means and on the opposite side of said filter from that of said inlet means in axial alignment with the outlet end of said inlet means,
means for adjusting the speed of the motor of said suction means to control fluid flow through said filter element in alignment therewith to establish a static condition between fluid flow through said collector device and that of the fluid flow surrounding said device,
fluid flow measuring means secured relative to said fluid inlet means to measure the fluid flow passing through said inlet means,
control means for controlling said motor to operate said valve,
said filter disc element including a plurality of cams on the periphery thereof one cam for each of said separate filter elements, and
control means associated with said cams to stop rotation of said filter disc after rotation sufficient for alignment of successive filter elements with the outlet end of said fluid inlet means.

References Cited

UNITED STATES PATENTS

| | | | |
|---|---|---|---|
| 1,134,294 | 4/1951 | Supanz | 55—467 |
| 1,904,973 | 4/1933 | Smellie | 15—319 |
| 2,244,165 | 6/1941 | MacFarland et al. | 55—470 X |
| 2,382,656 | 8/1945 | Obenshain et al. | 210—392 X |
| 2,722,998 | 11/1955 | Hall | 73—28 X |
| 2,838,084 | 6/1958 | Samler | 210—324 X |
| 2,928,497 | 3/1960 | Stockdale | 55—306 |
| 3,059,470 | 10/1962 | Baldwin et al. | 55—422 X |
| 3,121,545 | 2/1964 | Metetiou | 55—306 X |
| 3,217,351 | 11/1965 | Hayba | 15—375 |

FOREIGN PATENTS 1,347,826  11/1963  France.

HARRY B. THORNTON, *Primary Examiner.*

D. TALBERT, *Assistant Examiner.*